United States Patent
Saitou et al.

(10) Patent No.: US 7,224,136 B2
(45) Date of Patent: May 29, 2007

(54) CONTROL APPARATUS FOR CLOSURE DEVICE

(75) Inventors: Toshihiro Saitou, Toyohashi (JP); Kazuyuki Hirai, Kasugai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 0 days.

(21) Appl. No.: 11/475,084

(22) Filed: Jun. 27, 2006

(65) Prior Publication Data

US 2006/0290309 A1    Dec. 28, 2006

(30) Foreign Application Priority Data

Jun. 28, 2005    (JP)    ............................. 2005-188112

(51) Int. Cl.
  *H02P 1/00*    (2006.01)
  *B60J 1/17*    (2006.01)
  *E05F 15/16*   (2006.01)

(52) U.S. Cl. .................... 318/286; 318/282; 318/434; 318/443; 318/466; 49/26; 49/28

(58) Field of Classification Search ........ 318/280–283, 318/286, 466, 468, 434, 443, 445; 49/26, 49/28
See application file for complete search history.

(56) References Cited

U.S. PATENT DOCUMENTS 5,422,551 A * 6/1995 Takeda et al. .............. 318/265
5,689,160 A * 11/1997 Shigematsu et al. ........ 318/281
6,100,658 A    8/2000 Kume et al.
6,274,947 B1 * 8/2001 Terashima .................. 307/10.1
6,667,590 B2 * 12/2003 Nagaoka .................... 318/286
6,710,561 B2 * 3/2004 Dobson ..................... 318/286
6,753,669 B2 * 6/2004 Spreng et al. .............. 318/469
6,906,482 B2 * 6/2005 Shimizu et al. ............. 318/286

FOREIGN PATENT DOCUMENTS

| JP | A-8-184257  | 7/1996 |
| JP | A-10-25963  | 1/1998 |
| JP | A-10-54175  | 2/1998 |
| JP | A-10-169310 | 6/1998 |

* cited by examiner

*Primary Examiner*—Lincoln Donovan
*Assistant Examiner*—Eduardo Colon Santana
(74) *Attorney, Agent, or Firm*—Posz Law Group, PLC

(57) ABSTRACT

A control apparatus for a closure device includes pinch detector for detecting a foreign body being pinched by an opening/closing member when the variation degree of a movement of the opening/closing member reaches a predetermined threshold value. When this control apparatus for a closure device determines that a vehicle is running, the threshold value is set at a second threshold value, which is reduced in a detection sensitivity of pinch as compared with a first threshold value set when the vehicle is stationary. When the apparatus detects that a load not smaller than a predetermined value is applied by disturbance to the opening/closing member in a closing direction, the threshold value is set at a third threshold value, which is reduced in the detection sensitivity of pinch as compared with the second threshold value.

4 Claims, 3 Drawing Sheets

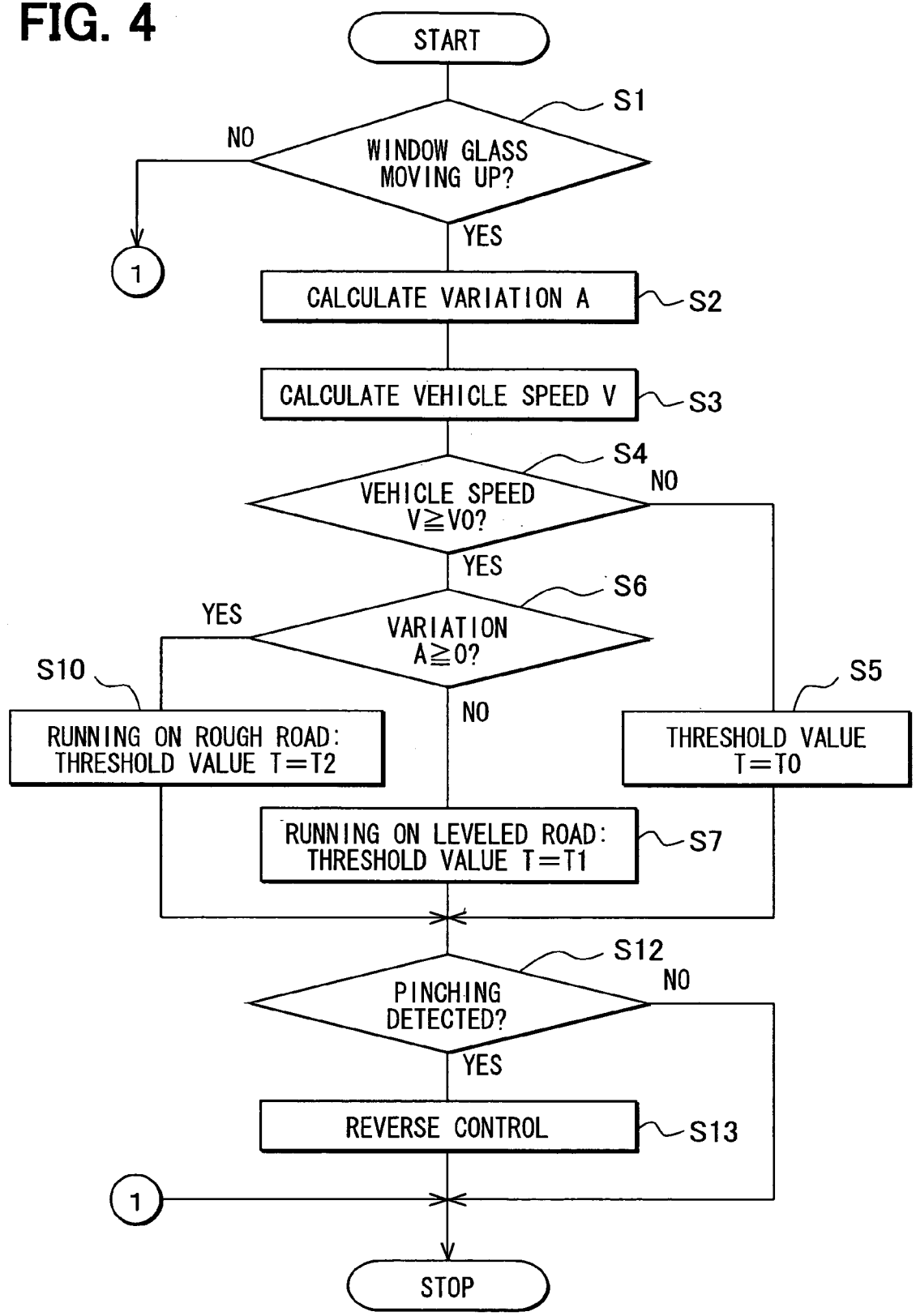

CONTROL APPARATUS FOR CLOSURE DEVICE

CROSS REFERENCE TO RELATED APPLICATION

This application is based upon and claims the benefit of priority of Japanese Patent Application No. 2005-188112 filed on Jun. 28, 2005, the content of which is incorporated herein by reference.

FIELD OF THE INVENTION

The present invention relates to a control apparatus for a closure device and, in particular, to a control apparatus for a closure device capable of detecting that a foreign body is pinched by an opening/closing member.

BACKGROUND OF THE INVENTION

Conventionally, when a device for driving an opening/closing member such as a power window device and a sunroof device of a vehicle detects that a foreign body is pinched by an opening/closing member, the device performs an automatic reverse control. The device like this calculates variation (variation in the number of revolutions or the rate of variation, variation in the moving speed of the opening/closing member, and the like) caused when the foreign body is pinched in pinch detection processing and determines that the foreign body is pinched when this variation exceeds a predetermined threshold value.

For example, taking a power window device as an example, when a vehicle stops, load other than self weight and sliding resistance are not applied to a window glass, but when the vehicle is running, an external load (disturbance) is applied to the window glass by vibration. There is a case where this external load causes the same variation as is caused when a foreign body is pinched. This presents a problem that when the vehicle is running, in the process of closing the window glass, the device falsely detects a foreign body being pinched and performs a reverse operation.

In a control apparatus for a closure device disclosed in JP-H08-184257-A, when a vehicle is running, an automatic reverse control is prohibited. Hence, it is possible to avoid a window glass from being reversely moved by the false detection of pinch of the foreign body when the vehicle is running.

Moreover, in a control apparatus for opening/closing a window disclosed in JP-H10-169310-A, since a large disturbance is applied to the window when a vehicle is running on a rough road, the false detection of pinch is prevented by making a threshold value larger than a normal threshold value. That is, when the vehicle is running and climbs over a protrusion or passes over a bump, by the effect of inertia applied to the window glass, load is applied to a driving motor to vary the number of revolutions of the motor and its rate of change.

When the vehicle is running on a rough road, a large disturbance is periodically applied to the window glass. It is known that: usually, first, a disturbance is applied to the window glass in a direction to close the window glass (that is, in a direction to accelerate a motor when the window glass is closed); successively, a disturbance is applied to the window glass in a direction to open the window (that is, in a direction to decelerate the motor when the window glass is closed); and thereafter, these disturbances are applied to the window glass continuously and repeatedly.

For this reason, the control apparatus for opening/closing a window disclosed in the JP-H10-169310-A is constructed in the following manner: that is, when a large disturbance is applied to the window glass in the direction to accelerate the motor, the vehicle is assumed to be running on the rough road and a threshold value is set at a large value to reduce detection sensitivity to thereby prevent pinch of the foreign body from being falsely detected by a large disturbance successively applied to the window glass in the direction to decelerate the motor.

However, in the technology disclosed in JP-H08-184257-A, when the vehicle is running, the false detection of pinch of the foreign body does not occur but a foreign body might be pinched because the automatic reverse control is prohibited.

Moreover, in the technology disclosed in JP-H10-169310-A, when a large disturbance occurs when the vehicle is running on the rough road, the false detection of pinch of the foreign body can be prevented, but there is presented a problem that pinch is falsely detected by a small disturbance caused when the vehicle is running on a leveled road. Moreover, when a threshold value is set so as to prevent pinch of the foreign body from being falsely detected by such a small disturbance, there is presented a problem that a pinch load when the vehicle is stationary becomes large.

SUMMARY OF THE INVENTION

In view of the above-mentioned problems, the object of the present invention is to provide a control apparatus for a closure device capable of preventing pinch of a foreign body from being falsely detected by a normal small disturbance caused when a vehicle is running or by a large disturbance caused particularly when the vehicle is running on a rough road, without making a pinch load larger than necessary.

The control apparatus for a closure device has: a drive means that opens and closes an opening/closing member; a movement detecting means that detects a movement of the opening/closing member opened and closed by the drive means; and a pinch detecting means that calculates a variation degree of the movement detected by the movement detecting means and detects a foreign body being pinched by the opening/closing member when the variation degree reaches a predetermined threshold value.

The control apparatus for a closure device further has: a vehicle speed detecting means that detects a running speed of a vehicle; a threshold value setting means that sets the threshold value; and a disturbance detecting means that detects a load larger than a predetermined value and is applied to the opening/closing member in a closing direction on the basis of the variation degree. The threshold value setting means sets the threshold value at a second threshold value, which is reduced in a detection sensitivity of pinch as compared with a first threshold value set when the vehicle is stationary, when the vehicle speed detecting means determines that the vehicle is running, and sets the threshold value at a third threshold value, which is reduced in the detection sensitivity of pinch as compared with the second threshold value when the disturbance detecting means detects that a load not smaller than a predetermined value is applied to the opening/closing member.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 4 is a processing flow of a pinch detection determination.

DESCRIPTION OF THE PREFERRED EMBODIMENTS

Hereinafter, one embodiment of the present invention will be described with reference to the drawings. Here, needless to say, the construction and the procedure to be described below are not limited to the present invention but can be variously modified according to the spirit and scope of the present invention.

Figure 1:
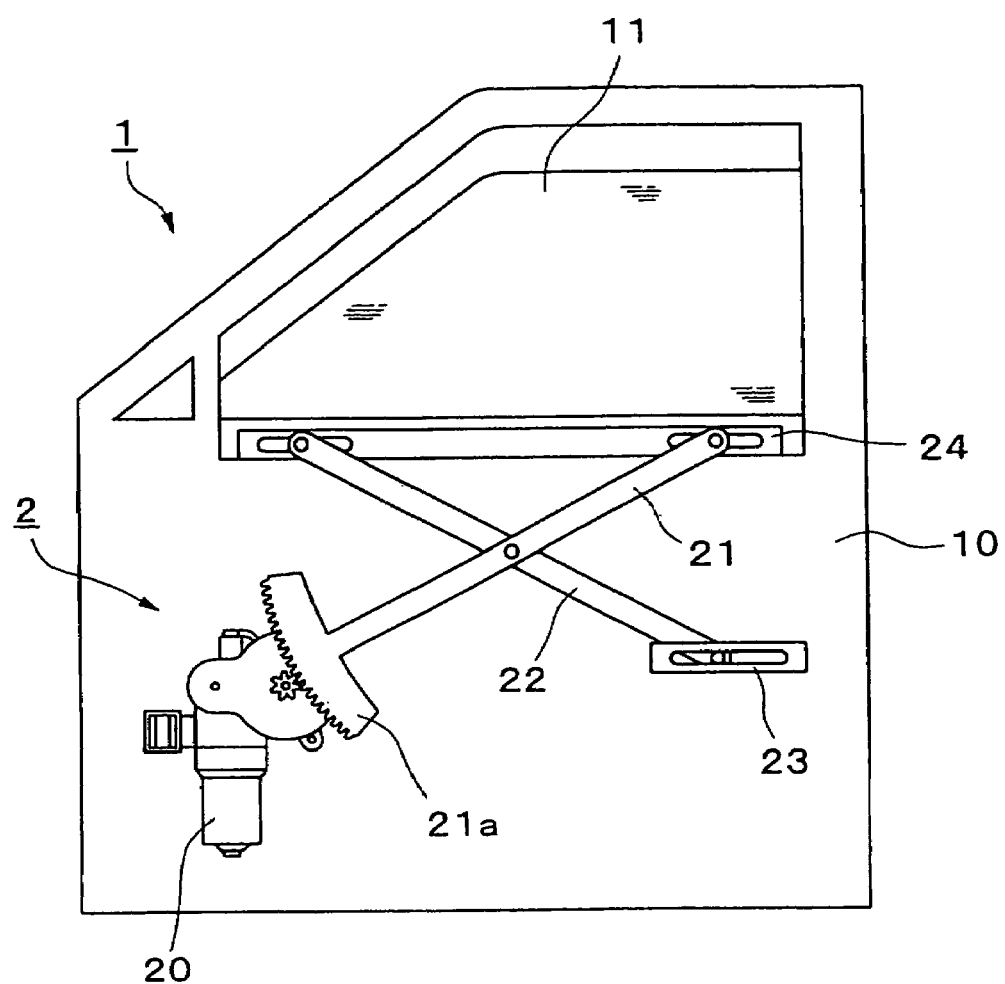
FIG. 1 is a diagram of a power window device according to one embodiment of the present invention.
Figure 2:
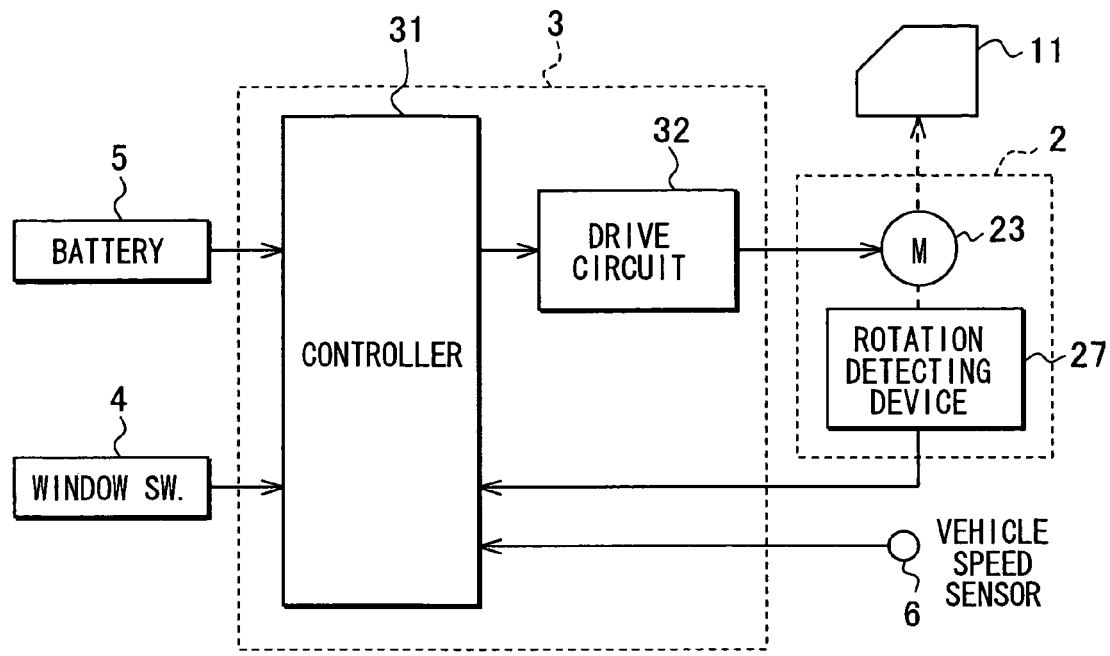
FIG. 2 is an electric construction diagram of the power window device in FIG. 1.
Figure 3:
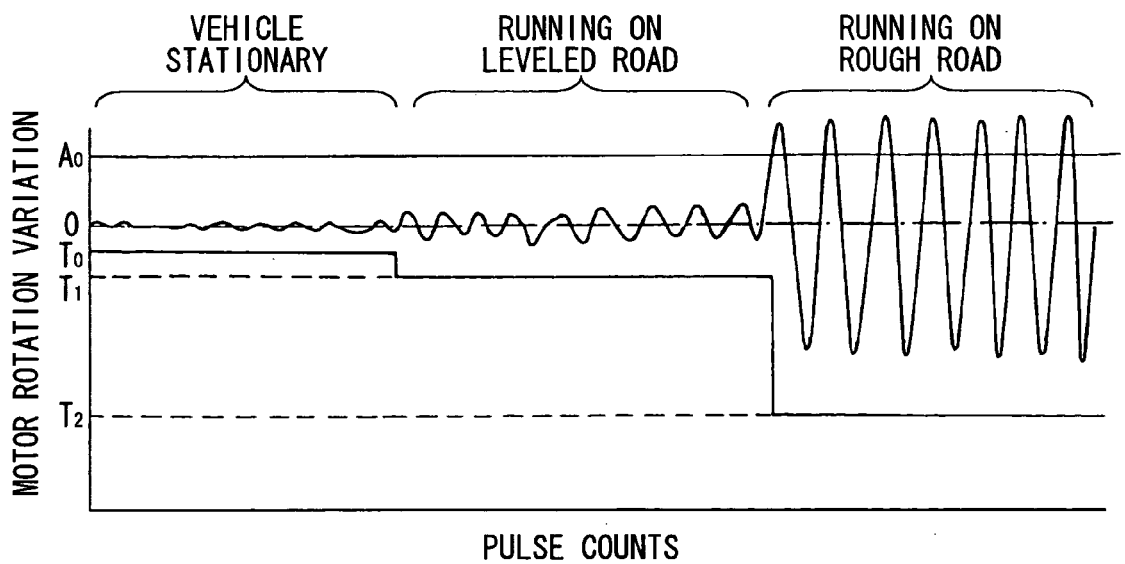
FIG. 3 is a graph showing a time change in the amount of rotational variation.

FIG. 1 to FIG. 4 relate to one embodiment of the present invention. FIG. 1 is a diagram of a power window device and FIG. 2 is an electric construction diagram of the power window device in FIG. 1 and FIG. 3 is a graph showing a time change in the amount of rotational variation and FIG. 4 is a processing flow of a pinch detection determination.

Hereinafter, one embodiment will be described in which the present invention is applied to a power window device. A diagram to show a power window device 1 of this embodiment (hereinafter referred to as "device 1") is shown in FIG. 1 and an electric construction diagram of the device 1 is shown in FIG. 2. The power window device 1 of this embodiment moves up and down (opens and closes) a window glass 11 as a moving member arranged in a door 10 of a vehicle by the rotation of a motor 20. The power window device 1 has main constituent elements including: driving means 2 for opening and closing the window glass 11; control means 3 for controlling the operation of the driving means 2; an operating switch 4 used by an occupant so as to instruct an operation; and a vehicle speed sensor 6 for detecting the running speed of a vehicle.

In this embodiment, the window glass 11 is moved up and down between an upper fully-closed position and a lower fully-opened position along a rail (not shown).

The driving means 2 of this embodiment has main constituent elements including: a motor 20 having a speed reduction mechanism fixed to the door 10; an up-and-down arm 21 provided with a fan-shaped gear 21a driven by the motor 20; a driven arm 22 crossing the up-and-down arm 21 and rotatably supported; a fixed channel 23 fixed to the door 10; and a glass-side channel 24 integrated with the window glass 11.

The motor 20 of this embodiment is constructed as follows: that is, when the motor 20 is supplied with electric power from the control means 3, current is passed through the winding of an armature to produce a magnetic attraction action between the armature and a stator having a magnet to thereby rotate the armature normally or reversely. In the driving means 2 of this embodiment, when the up-and-down arm 21 and the driven arm 22 rock according to the rotation of the motor 20, the end portions of these arms are restricted so as to slide by the channels 23, 24 and the up-and-down arm 21 and the driven arm 22 are driven as an X link to thereby move up and down the window glass 11.

The motor 20 of this embodiment has a rotation detecting device 27 integrated into itself. The rotation detecting device 27 outputs a pulse signal (rotation speed signal) synchronous with the rotation of the motor 20 to the control means 3. The rotation detecting device 27 of this embodiment is constructed so as to detect the magnetic change of a magnet rotating with the output shaft of the motor 20 by a plurality of Hall devices. That is, the pulse signal is outputted at intervals of a predetermined amount of movement of the window glass 11 or at intervals of a predetermined rotational angle of the motor 20. With this, the rotation detecting device 27 can output a signal responsive to the movement of the window glass 11 nearly proportional to the rotational speed of the motor 20. The control means 3 calculates the moving speed of the window glass 11 (or rotational speed of the motor 20 proportional to this) by the pulse signal from the rotation detecting device 27. In this embodiment, movement detecting means is constructed of the rotation detecting device 27 and the control means 3.

In this embodiment, a device using the Hall devices is used as the rotation detecting device 27. However, the device is not necessarily limited to this and any encoder capable of detecting the rotational speed of the motor 20 may be adopted. In this embodiment, in order to detect the rotational speed of the output shaft of the motor 20 responsive to the movement of the window glass 11, the motor 20 has the rotation detecting device 27 integrated into itself. However, the movement of the window glass 11 may be directly detected by well-known means.

The control means 3 of this embodiment is constructed of a controller 31 and a drive circuit 32. The controller 31 and the drive circuit 32 are supplied with electric power necessary for operation from a battery mounted in the vehicle.

The controller 31 of this embodiment is constructed of a microcomputer including a CPU, a memory such as ROM and RAM, an input circuit, an output circuit, and the like. The CPU is connected to the memory, the input circuit, and the output circuit through a bus. Here, the controller 31 is not necessarily constructed of these components but the controller 31 may be constructed of a DSP and a gate array.

In a normal operation, the controller 31 rotates the motor 20 normally or reversely via the drive circuit 32 on the basis of an operation signal from an operating switch 4 to open and close the window glass 11. The controller 31 receives a pulse signal from the rotation detecting device 27 and can detect a foreign body being pinched between the upper end of the window glass 11 and a window frame on the basis of this pulse signal. When a foreign body is detected being pinched, the controller 31 rotates the motor 20 in a direction to open the window glass 11 via the drive circuit 32 to thereby open the window glass 11.

The drive circuit 32 of this embodiment is constructed of an IC including an FET and changes the polarity of power supply to the motor 20 on the basis of an input signal from the controller 31. That is, when the drive circuit 32 receives a normal rotation instruction signal from the controller 31, the drive circuit 32 supplies electric power to the motor 20 so as to rotate the motor 20 in the direction of normal rotation, and when the drive circuit 32 receives a reverse rotation instruction signal from the controller 31, the drive circuit 32 supplies electric power to the motor 20 so as to rotate the motor 20 in the direction of reverse rotation. Here, the drive circuit 32 may be constructed so as to change the polarity by the use of a relay circuit. Moreover, the drive circuit 32 may be integrated into the controller 31.

The controller 31 detects a rising portion and a falling portion (pulse edges) of an inputted pulse signal and calculates the rotational speed (rotational period) of the motor 20 on the basis of the interval (period) of these pulse edges and detects the direction of rotation of the motor 20 on the basis of the phase difference of the respective pulse signals. In other words, the controller 31 indirectly calculates the moving speed of the window glass 11 on the basis of the rotational speed of the motor 20 and identifies the direction of movement of the window glass 11 on the basis of the direction of rotation of the motor 20. Moreover, the controller 31 counts the pulse edges. This pulse count is added or subtracted according to the opening/closing operation of the window glass 11. The controller 31 identifies the opening/closing position of the window glass 11 by the magnitude of this count.

Moreover, the controller 31 calculates the rotational speed for each pulse signal and calculates the difference between the rotational speed corresponding to the last pulse signal and the rotational speed corresponding to the present pulse signal to calculate a variation amount A of rotational speed. In other words, when the pulse interval becomes long (speed is decreased in a direction to close the window glass 11), the variation amount A becomes a negative value. In this regard, in order to improve a processing accuracy and stabilization, several pulse signals may be grouped and the rotational speed and the variation amount A may be calculated by the group.

The operating switch 4 of this embodiment is constructed of a toggle type switch to be operated in two steps and is provided with an opening switch, a closing switch, and an automatic switch. When an occupant operates this operating switch 4, an instruction signal for opening/closing the window glass 11 is outputted to the controller 31.

Specifically, when the operating switch 4 is operated one step to one side, the opening switch is turned on and a normal opening instruction signal for normally opening the window glass 11 (that is, opening the window glass 11 only for an operating time) is outputted to the controller 31. When the operating switch 4 is operated one step to the other side, the closing switch is turned on and a normal closing instruction signal for normally closing the window glass 11 (that is, closing the window glass 11 only for an operating time) is outputted to the controller 31.

Moreover, when the operating switch 4 is operated two steps to one side, the opening switch and the automatic switch are turned on together and an automatic opening instruction signal for automatically opening the window glass 11 (that is, opening the window glass 11 to a fully-open position even when the operation is stopped) is outputted to the controller 31. When the operating switch 4 is operated two steps to the other side, the closing switch and the automatic switch are turned on together and an automatic closing instruction signal for automatically closing the window glass 11 (that is, closing the window glass 11 to a fully-closed position even when the operation is stopped) is outputted to the controller 31.

The controller 31 drives the motor 20 via the drive circuit 32 to normally open the window glass 11 while receiving the normal opening instruction signal from the operating switch 4 (while the operating switch 4 is operated). In contrast, the controller 31 drives the motor 20 via the drive circuit 32 to normally close the window glass 11 while receiving the normal closing instruction signal from the operating switch 4 (while the operating switch 4 is operated).

Moreover, when the controller 31 receives an automatic opening instruction signal from the operating switch 4, the controller 31 drives the motor 20 via the drive circuit 32 to automatically open the window glass 11 to a fully-open position. In contrast, when the controller 31 receives an automatic closing instruction signal from the operating switch 4, the controller 31 drives the motor 20 via the drive circuit 32 to automatically close the window glass 11 to a fully-closed position.

The speed sensor 6 of this embodiment is mounted so as to detect the running speed of the vehicle and produces the speed pulse of frequency proportional to the running speed of the vehicle and outputs the speed pulse to the controller 31. The controller 31 detects this speed pulse and calculates a vehicle speed V at intervals of a predetermined time. In the present invention, vehicle speed detection means is constructed of the vehicle speed sensor 6 and the controller 31. Here, a construction may be adopted in which the output signal of the vehicle speed sensor 6 is outputted to a vehicle ECU and in which the controller 31 receives a vehicle speed signal from the vehicle ECU through a communication line.

When the controller 31 closes the window glass 11 (normal closing operation and automatic closing operation), the controller 31 monitors whether a foreign body is pinched by the window glass 11 or not. That is, when a foreign body is pinched by the window glass 11, the moving speed of the window glass 11 is decreased and the rotational speed of the motor 20 is decreased (rotational period is elongated) in relation to the decrease in the moving speed of the window glass 11. For this reason, the controller 31 of this embodiment always monitors the variation of the rotational speed of the motor 20.

When a variation degree of this rotational speed reaches a set pinch threshold value T, the controller 31 of this embodiment determines that a foreign body is pinched (detection of pinch). In this embodiment, the variation amount A of rotational speed for each predetermined time (that is, rate of change of the rotational speed or acceleration) is calculated as the degree of variation, and the variation amount A is compared with the threshold value T. This variation amount A indirectly corresponds to the rate of change of the moving speed or the acceleration of the window glass 11. In the present invention, the controller 31 corresponds to pinch detection means.

FIG. 3 shows a time change of the variation amount A while the vehicle is stationary, running on a leveled road, and running on a rough road. A vertical axis expresses the variation amount A of the rotational speed of motor and a horizontal axis expresses the number of counts of the pulse signal (pulse count) from the rotation detecting device 27. The positive side of the vertical axis shows that the speed of the window glass 11 is increased in a closing direction and the negative side shows that the speed of the window glass 11 is decreased in the closing direction. That is, when a foreign body is pinched, the moving speed of the window glass 11 is decreased in the closing direction and hence the variation amount A becomes a negative value.

According to FIG. 3, it is clear that while the vehicle is stationary, the variation amount A is varied within a small variation range mainly by sliding resistance. While the vehicle is running on the leveled road, vibrations from the road surface are applied to the window glass 11 to vary the variation amount A within a slightly larger variation range than is produced while the vehicle is stationary. Moreover, while the vehicle is running on the rough road, large vibrations from the road surface are transmitted to the window glass 11 and hence the variation amount A is varied within a considerably larger variation range than is produced while the vehicle is running on the leveled road.

When the controller 31 determines that a foreign body is pinched, in order to release the foreign body pinched by the window glass 11, the controller 31 reversely rotates the motor 20 to open the window glass 11 by a predetermined amount. In this regard, when the controller 31 determines that a foreign body is pinched, the controller 31 may stop the operation of the motor 20 to stop the further closing operation of the window glass to thereby enable the foreign body pinched by the window glass 11 to be released.

Moreover, the controller 31 of this embodiment is constructed so as to change the threshold value T under predetermined conditions. The controller 31 of this embodiment corresponds to threshold value setting means.

Specifically, in this embodiment, a stationary-state threshold value (first threshold value) T0, a running-state threshold value (second threshold value) T1, and a rough-road-running-state threshold value (third threshold value) T2 are set as the threshold value T (refer to FIG. 3).

The stationary-state threshold value T0 is set as an initial value and is used when a vehicle speed V is smaller than a predetermined speed. The stationary-state threshold value T0 is determined by adding a predetermined margin to the range of small variation usually caused by the above-mentioned sliding resistance and the like so as to prevent the false detection of pinch.

When the vehicle speed V is not smaller than a predetermined value and it is determined that the vehicle is running, the running-state threshold value T1 is determined by adding a predetermined margin to the range of variation usually caused by the above-mentioned running on the leveled road.

When the vehicle speed V is not smaller than a predetermined value and the variation amount A reaches a predetermined positive disturbance threshold value A0, the rough-road-running-state threshold value T2 is set. The rough-road-running-state threshold value T2 is determined by adding a predetermined margin to the range of variation usually caused by the above-mentioned running on the rough road.

When the vehicle runs on the rough road, as described above, the variation amount A varies within a large variation range. However, in many cases, the variation amount A once swings to a positive side and then swings to a negative side and thereafter swings repeatedly in this manner. In this embodiment, this characteristic is used and the controller 31 as disturbance detection means detects whether or not the variation amount A reaches the positive disturbance threshold A0. When the variation amount A reaches the positive disturbance threshold A0, assuming that the vehicle is running on the rough road, a detection sensitivity is reduced by again setting the threshold value T at a large value on a negative side to thereby prevent the false detection of pinch.

The stationary-state threshold value T0, the running-state threshold value T1, and the rough-road-running-state threshold value T2 are values increasing on the negative side in this order (that is, the detection sensitivity of pinch is reduced).

Next, the processing of determining pinch by the controller 31 in this embodiment will be described on the basis of FIG. 4. The controller 31 repeatedly performs this processing at intervals of a predetermined time.

First, the controller 31 determines in a step S1 by the pulse signal from the rotation detecting device 27 whether or not the window glass 11 is moving up.

When the window glass 11 is not moving up (step S1: NO), the controller 31 does not perform anything and finishes the processing.

In contrast, when the window glass 11 is moving up (step S1: YES), the controller 31 calculates the variation amount A in a step S2 and then calculates the vehicle speed V in a step S3. In the step S3, the controller 31 calculates the vehicle speed V from the pulse interval of speed pulse from the vehicle speed sensor 6.

In a step S4, the controller 31 determines from the vehicle speed V whether or not the vehicle is running. Specifically, the controller 31 determines whether or not the calculated vehicle speed V is not smaller than a predetermined vehicle speed V0. When the calculated vehicle speed V is not smaller than the predetermined vehicle speed V0 (step S4: YES), the controller 31 determines that the vehicle is running and advances the processing to a step S6. In contrast, when the calculated vehicle speed V is smaller than the predetermined vehicle speed V0 (step S4: NO), the controller 31 determines that the vehicle is stationary and sets the threshold value T at the stationary-state threshold value T0 in a step S5 and then advances the processing to a step S12.

Next, the controller 31 determines whether or not the variation amount A calculated in the step S2 is not smaller than the predetermined positive disturbance threshold value A0 (step S6).

When the variation amount A calculated in the step S2 is not smaller than the predetermined positive disturbance threshold value A0 (step S6: YES), the variation amount A greatly varies in the direction of acceleration and hence it can be determined that this is caused by the running on the rough road. Hence, in a step S10, the controller 31 sets the threshold value T at the rough-road-running-state threshold value T2 and then advances the processing to the step S12.

In contrast, when the variation amount A calculated in the step S2 is smaller than the predetermined positive disturbance threshold value A0 (step S6: N0), in a step S7, the controller 31 sets the threshold value T at the running-state threshold value T1 and then advances the processing to the step S12.

In the step 12, the controller 12 compares the set threshold value T with the variation amount A and determines whether or not a foreign body is pinched. When the variation amount A reaches the set threshold value T, that is, the variation amount A is a value equal to or larger on a negative side than the threshold value T, the controller 12 determines that a foreign body is pinched.

When the variation amount A reaches the threshold value T (step S12: YES), the controller 31 determines that a foreign body is pinched and performs reverse control in a step S13. In the step S13, the controller 12 performs reverse control processing to open the window glass 11 to a middle position.

In contrast, when the variation amount A does not reach the threshold value T (step S12: NO), the controller 31 determines that a foreign body is not pinched and finishes the processing.

As described above, in the device 1 of this embodiment, the detection sensitivity of pinch when the vehicle is running is reduced as compared with the detection sensitivity of pinch when the vehicle is stationary to prevent the false detection of pinch when the vehicle is running. Moreover, the threshold value T of pinch can be set at different values in accordance with small disturbance caused when the vehicle is running on the leveled road and large disturbance caused when the vehicle is running on the rough road. Hence, when the vehicle is running on the leveled road and when the vehicle is running on the rough road, it is possible to prevent the window glass 11 from being reversely moved by error by the false detection of pinch.

Moreover, by setting the threshold value T according to the circumstances in the manner, it is possible to achieve both of reducing a pinch load when pinch is detected and preventing the false detection of pinch.

That is, according to the control apparatus for a closure device of the present invention, the threshold value for detecting pinch is set at different values according to states where the vehicle is stationary, running, and running on the rough road. Hence, when the vehicle is stationary, running, and running on the rough road, it is possible to prevent the false detection of pinch caused by the disturbance without increasing pinch load applied to a foreign body when the foreign body is pinched more than necessary.

In the above-mentioned embodiment, the stationary-state threshold T0, the running-state threshold T1, and the rough-road-running-state threshold T2 are set at respective constant values. However, the threshold values are not necessarily limited to these constant values but, for example, the running-state threshold value T1 may be changed stepwise according to the magnitude of the vehicle speed V and the rough-road-running-state threshold T2 may be changed stepwise according to the magnitude of the detected positive variation amount A.

Moreover, in the above-mentioned embodiment, when the vehicle speed V is smaller than the predetermined vehicle speed V0 and hence it is not determined that the vehicle is running, the threshold value T is not changed to the rough-road-running-state threshold T2. However, in order to simplify the processing, simply, when the variation amount A reaches the disturbance threshold value A0, the threshold value T may be, changed to the rough-road-running-state threshold T2.

Further, in the above-mentioned embodiment, when the threshold value T is set at the rough-road-running-state threshold T2 and then a predetermined set time for the rough-road-running-state threshold T2 passes, the threshold value T is reset to the running-state threshold value T1. However, for example, the threshold value T may be kept at the rough-road-running-state threshold T2 until the operation of moving up the window glass 11 is stopped by a switch operation or the window glass 11 reaches the fully-closed position.

Still further, in the above-mentioned embodiment has been described the embodiment in which the control apparatus for a closure device of the present invention is applied to the power window device 1 of the vehicle. However, the present invention may be generally applied to a device for opening and closing an opening/closing member such as a sunroof opening/closing device and a sliding door opening/closing device.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control apparatus for a closure device comprising:
   a drive means that opens and closes an opening/closing member;
   a movement detecting means that detects a movement of the opening/closing member opened and closed by the drive means; and
   a pinch detecting means that calculates a variation degree of the movement detected by the movement detecting means and detects a foreign body being pinched by the opening/closing member when the variation degree reaches a predetermined threshold value, characterized by further comprising:
   a vehicle speed detecting means that detects a running speed of a vehicle;
   a threshold value setting means that sets the threshold value; and
   a disturbance detecting means that detects a load larger than a predetermined value and is applied to the opening/closing member in a closing direction on the basis of the variation degree,
   wherein the threshold value setting means sets the threshold value at a second threshold value, which is reduced in a detection sensitivity of pinch as compared with a first threshold value set when the vehicle is stationary, when the vehicle speed detecting means determines that the vehicle is running, and sets the threshold value at a third threshold value, which is reduced in the detection sensitivity of pinch as compared with the second threshold value when the disturbance detecting means detects that a load not smaller than a predetermined value is applied to the opening/closing member.

2. The control apparatus for a closure device according to claim 1, wherein the threshold value setting means sets the threshold value at the third threshold value when the vehicle speed detecting means determines that the vehicle is running and when the disturbance detecting means detects that a load not smaller than the predetermined value is applied to the opening/closing member in an opening direction.

3. The control apparatus for a closure device according to claim 1, wherein the threshold value setting means sets the threshold value at the third threshold value according to a detection result of the disturbance detecting means.

4. The control apparatus for a closure device according to claim 3, wherein the threshold value setting means resets the threshold value to the second threshold value after a predetermined time passes.

* * * * *